(12) United States Patent
Calvert (10) Patent No.: US 6,788,803 B2
(45) Date of Patent: Sep. 7, 2004

(54) METHODS AND SYSTEMS FOR MAKING DISPOSABLE ABSORBENT ARTICLE HAVING GRAPHICS

(75) Inventor: Mickey Calvert, Norcross, GA (US)

(73) Assignee: Paragon Trade Brands, Inc., Norcross, GA (US)

( * ) Notice: Subject to any disclaimer, the term of this patent is extended or adjusted under 35 U.S.C. 154(b) by 39 days.

(21) Appl. No.: 10/014,424

(22) Filed: Dec. 14, 2001

(65) Prior Publication Data

US 2003/0112999 A1 Jun. 19, 2003

(51) Int. Cl.⁷ .............................. G06K 9/00; B31B 1/00; B32B 31/00
(52) U.S. Cl. ...................... 382/111; 382/141; 382/151; 493/11; 156/64
(58) Field of Search ................................. 382/111, 100, 382/141, 151, 288, 291, 294; 493/11; 700/124; 702/82; 156/64

(56) References Cited

U.S. PATENT DOCUMENTS

| | | | |
|---|---|---|---|
| 4,237,539 A | 12/1980 | Piovoso et al. ................ 702/35 |
| 4,264,957 A | 4/1981 | Pautzke ....................... 700/125 |
| 4,435,837 A * | 3/1984 | Abernathy ................... 382/111 |
| 4,456,374 A | 6/1984 | Langberg ................. 366/237.2 |
| 4,490,618 A | 12/1984 | Cielo ..................... 250/559.01 |
| 4,528,630 A | 7/1985 | Sargent ....................... 700/125 |
| 4,532,596 A | 7/1985 | Pugsley ....................... 700/125 |
| 4,603,976 A | 8/1986 | Fetzer et al. ................ 356/402 |
| 4,608,115 A | 8/1986 | Schroth et al. ............. 156/519 |
| 4,646,342 A | 2/1987 | Hargrave et al. ............. 379/24 |
| 4,680,205 A | 7/1987 | Lerner et al. ................ 428/29 |
| 4,719,575 A | 1/1988 | Gnuechtel ................... 700/122 |
| 4,757,930 A | 7/1988 | Ditto ............................ 226/27 |
| 4,786,355 A | 11/1988 | Kontz .......................... 156/556 |
| 4,795,510 A | 1/1989 | Wittrock et al. ............... 156/64 |
| 4,837,715 A | 6/1989 | Ungpiyakul et al. ........... 702/82 |
| 4,955,265 A | 9/1990 | Nakagawa et al. ............. 83/74 |
| 4,961,149 A | 10/1990 | Schneider et al. ........... 700/135 |
| 5,026,458 A | 6/1991 | Beuther ....................... 162/198 |
| 5,235,515 A | 8/1993 | Ungpiyakul et al. ......... 700/125 |
| 5,281,207 A | 1/1994 | Chmielewski et al. ....... 604/378 |
| 5,492,591 A | 2/1996 | Herrmann et al. ........... 156/538 |
| 5,863,288 A | 1/1999 | Baker ........................... 604/378 |
| 5,930,139 A | 7/1999 | Chapdelaine et al. ........ 700/118 |
| 6,033,502 A * | 3/2000 | Coenen et al. ................ 156/64 |
| 6,068,620 A | 5/2000 | Chmielewski ............... 604/378 |
| 6,245,168 B1 | 6/2001 | Coenen et al. ................ 156/64 |
| 6,253,159 B1 | 6/2001 | Bett et al. ....................... 702/85 |
| 6,266,436 B1 * | 7/2001 | Bett et al. ..................... 382/141 |
| 6,558,499 B1 | 5/2003 | Pargass et al. ............... 156/250 |

FOREIGN PATENT DOCUMENTS

| | | | | |
|---|---|---|---|---|
| DE | 3325126 C1 | 1/1985 | .......... | G01N/21/89 |
| GB | 1575140 | 9/1980 | .......... | G01N/21/89 |
| GB | 2143320 B | 10/1986 | .......... | G01N/21/89 |
| WO | WO 84/02190 | 6/1984 | .......... | G01N/23/223 |

OTHER PUBLICATIONS

Patent Cooperation Treaty (PCT/US02/39456), International Search Report (ISR) mailed Aug. 8, 2003.

* cited by examiner

Primary Examiner—Wenpeng Chen
(74) Attorney, Agent, or Firm—Hunton & Williams LLP (57) ABSTRACT

An absorbent article including one or more graphics disposed thereon and a method and system for making the same are provided according to the present invention. A picture is taken of the graphic. Based on the picture, a centroid position of the graphic is determined. The centroid position is compared with a target position. Based on the variation of the centroid position with the target position, the processing is adjusted so as to apply the graphic as desired.

20 Claims, 6 Drawing Sheets

METHODS AND SYSTEMS FOR MAKING DISPOSABLE ABSORBENT ARTICLE HAVING GRAPHICS

FIELD OF THE INVENTION

The present invention relates to disposable absorbent articles, and more particularly to disposable absorbent articles having one or more graphics thereon, and processes and systems for making the same.

BACKGROUND OF THE INVENTION

Traditionally, disposable absorbent articles, such as infant diapers or training pants, adult incontinence products and other such products, are constructed with a moisture-impervious outer backing sheet (or "backsheet"), a moisture-pervious body-contacting inner liner sheet (or "topsheet"), and a moisture-absorbent core (or "absorbent core") sandwiched between the liner sheet and the backing sheets. These disposable absorbent articles oftentimes include additional features such as elastic waist bands, elastic leg bands, and stretchable side panels. Further, decorative graphics can be incorporated into the disposable absorbent article for aesthetic and functional purposes.

Disposable absorbent articles are generally assembled on an automated production line by separately supplying the individual components of the absorbent article to the production line at predetermined locations along the machine direction, and layering the individual components to form an integrated absorbent article. Various known methods are available for bringing these individual components together so that the components in the integrated product are in a desired relation with respect to each other. In bringing these individual components together, various known methods have been used to sense the position of a particular component, and then to adjust the placement of subsequent components in order to properly position them with respect to the previously sensed component.

Illustratively, prior art methods for assembling components of absorbent articles have employed photo/optical techniques to sense reference markers on the individual components. The reference markers assist in cutting and placing the individual components onto the integrated absorbent article. The reference markers have typically been included in the final assembled product. This is so because the reference markers employed in prior techniques need to be sensed downstream in the production line to provide error correction, requiring complex feed-back control systems. However, the inclusion of the reference markers on the final assembled product can detract from the aesthetics of the product and are therefore not desirable. Further, the necessity to initially place the reference markers on the individual components is an added step that is not desirable.

The foregoing description of the various products, methods, and apparatus and their attendant disadvantages is in no way intended to limit the scope of the present invention, or to imply that the present invention does not include some or all of the various elements of the products, methods, and apparatus in one form or another. Indeed, various embodiments of the invention may be capable of overcoming some of the disadvantages noted herein, while still retaining some or all of the various elements of the products, methods, and apparatus in one form or another.

SUMMARY OF THE INVENTION

In response to the difficulties and problems encountered in the prior art, a method and system for making a disposable absorbent article having a graphic has been discovered.

In accordance with the present invention, there is provided an absorbent article including one or more graphics thereon, and a method and system for making the same. A digital picture is taken of the graphic. Based on the digital picture, a calculated centroid position of the graphic is determined. The calculated centroid position is compared with a target centroid position. Based on the variation of the calculated centroid position with the target centroid position, the processing is adjusted so as to apply the graphic as desired.

In accordance with a further aspect of the invention, a method is provided for disposing a graphic layer, including thereon a plurality of discrete graphics, on a product layer. The method comprises of providing a continuously moving graphic layer, the graphic layer having discrete graphics printed thereon; providing a continuously moving product layer of product; and inputting an input image of a graphic before the graphic is disposed on the product layer. The method further includes determining a calculated centroid position of the graphic based on the input image and comparing the calculated centroid position of the graphic with a target centroid position. Additionally, the method includes controlling the disposing of the graphic on the product layer based on the comparing.

These and other objects, features and advantages of the exemplary embodiments will become more readily apparent upon reading of the detailed description of the exemplary embodiments of this invention in conjunction with the following drawings.

DETAILED DESCRIPTION OF THE PREFERRED EMBODIMENTS

As described herein, the invention provides methods and systems for disposing a graphic on an absorbent disposable article during production. As used herein, any term used in the singular may be interpreted to be in the plural. Further, any term in the plural may be interpreted to be in the singular.

As used herein, the term "absorbent garment" or "absorbent article" refers to garments that absorb and contain exudates, and more specifically, refers to garments which are placed against or in proximity to the body of the wearer to absorb and contain the various exudates discharged from the body. A non-exhaustive list of examples of absorbent articles includes diapers, diaper covers, disposable diapers, training pants, feminine hygiene products, and adult incontinence products. The term "disposable absorbent garment" refers to absorbent garments that are intended to be discarded or partially discarded after a single use, i.e., they are not intended to be laundered or otherwise restored or reused.

The present invention can be used with all of the foregoing classes of absorbent articles, without limitation, whether disposable or otherwise. These classifications are used interchangeably throughout the specification, but are not intended to limit the claimed invention. The invention will be understood to encompass, without limitation, all classes and types of absorbent articles, including those described above.

Throughout this description, the expressions "upper layer" and "lower layer" or "above" and "below" that refer to the spatial relationships of respective layers of an absorbent garment, or devices used in systems for making absorbent garments are used merely to describe one layer above the other layer, or one item above another item as shown in the appended Figures. The upper layer or item need not always remain vertically above the other layer or item, and the lower layer or item need not always remain vertically below the other layer or item. Other configurations are contemplated within the context of the present invention.

Throughout this description, the term "disposed" and "disposing" and the expressions "disposed on," "disposing on," "disposed in," "disposed between" and variations thereof (e.g., a description of the article being "disposed" is interposed between the words "disposed" and "on") are intended to mean that one element can be integral with another element, or that one element can be a separate structure bonded to or placed with or placed near another element. Thus, a component that is "disposed on" an element of the absorbent garment can be formed or applied directly or indirectly to a surface of the element, formed or applied between layers of a multiple layer element, formed or applied to a substrate that is placed with or near the element, formed or applied within a layer of the element or another substrate, or other variations or combinations thereof.

Figure 1:
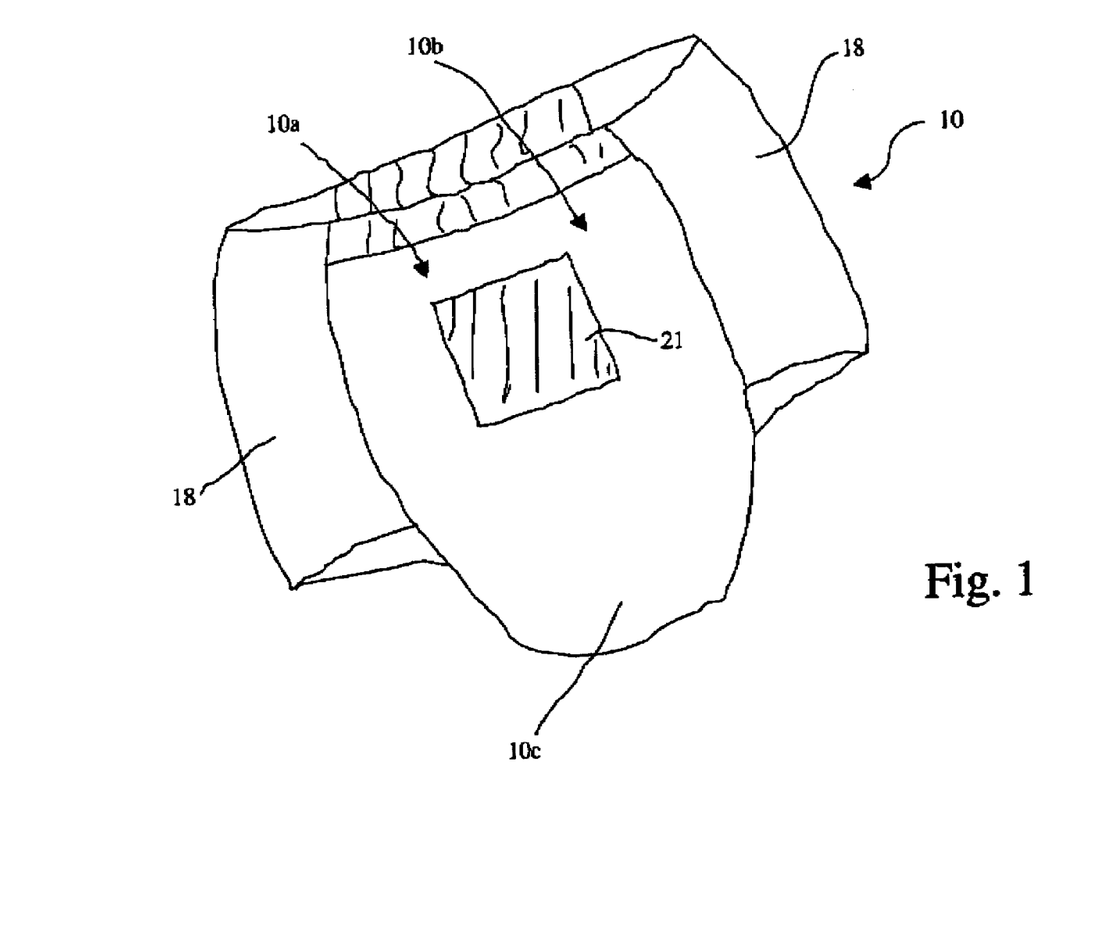
FIG. 1 is top view showing a child's training pant with a graphic thereon according to one embodiment of the invention.
Figure 2:
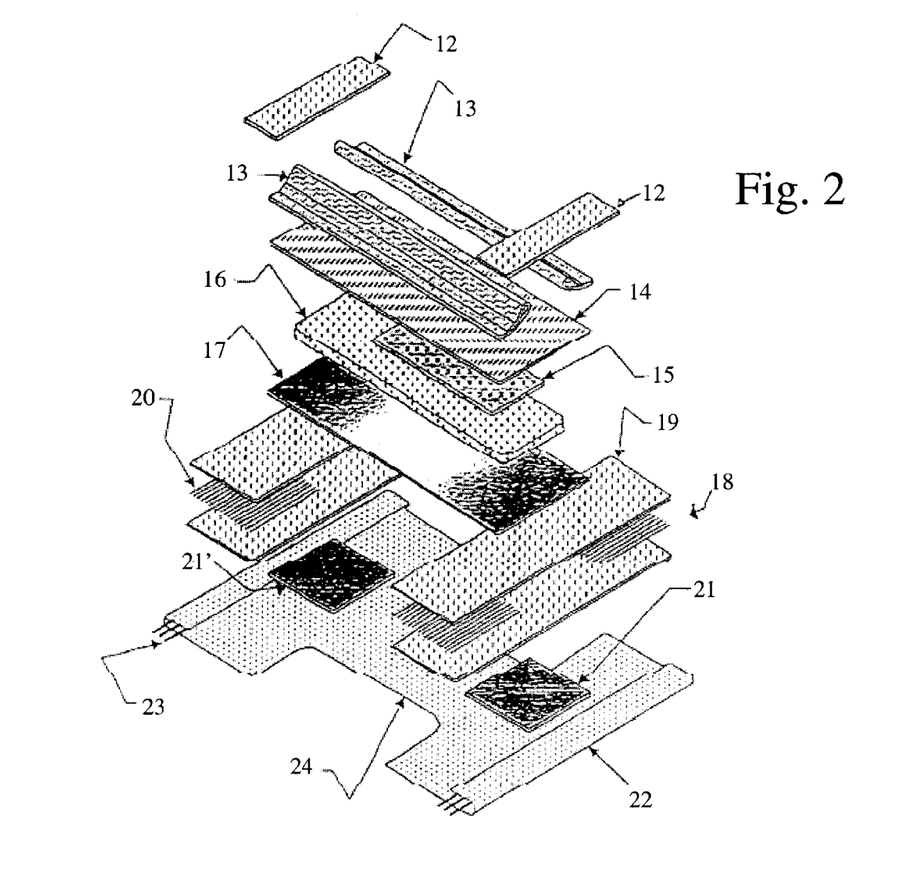
FIG. 2 is an exploded view of the training pant of FIG. 1 according to one embodiment of the invention.

The following detailed description will be made in the context of sensing and placing graphics in the manufacture of disposable absorbent articles, and specifically a child's training pant, as shown in FIGS. 1 and 2, for example.

The present invention provides for absorbent articles having graphics accurately cut and positioned with respect to other components of the absorbent article. Further, the term "graphic" as used herein can refer, but is not limited, to any design, pattern, indicia or the like. Examples of graphics include, but are not limited to, indicia highlighting or emphasizing leg and waist openings in order to make product shaping more evident or visible to the user; indicia highlighting or emphasizing areas of the product to simulate functional components such as elastic leg bands, elastic waistbands, and fly openings; indicia highlighting areas of the product to change the appearance of the size of the product; wetness indicators, temperature indicators, fit indicators, and the like; front and/or back labels or pictorials; indicia for aesthetic reasons; or written instructions, for example.

With reference to FIG. 1 for purposes of explanation only, an assembled training pant 10 according to a particularly preferred embodiment of the present invention comprises a front waist panel 10a, a rear waist panel 10b opposite the front waist panel 10a, and a crotch portion 10c located therebetween. The training pant 10 is provided with an absorbent core 16 positioned between a liquid impermeable backsheet 17 and a liquid permeable topsheet 14 (as shown in FIG. 2). The training pant further may include an outermost non-woven layer 22 having a cloth-like texture and elastic side panels 18 that are positioned between the liquid impermeable backsheet 17 and the outermost non-woven layer 22 in order to provide elasticity thereto. The liquid impermeable backsheet 17 can preferably be formed from polyethylene. However, any suitable material can be used, as is known in the art and described in, for example, U.S. Pat. No. 4,646,362, the disclosure of which is incorporated by reference herein in its entirety. The outermost non-woven layer 22 can preferably include at least one graphic 21 positioned thereon.

As shown in FIGS. 1 and 2, the absorbent article 10 includes a graphic 21. The graphic 21 can be disposed on either the exterior or interior face of the non-woven layer 22, or the graphic may be disposed on the interior or exterior face of backsheet 17. The graphic 21 generally includes a visually pleasing design or pattern and is applied to the absorbent article at a designated area in the final absorbent article 10. In one exemplary embodiment, one graphic is positioned on the front waist panel 10a of the final absorbent article, and another aesthetically corresponding graphic is positioned on the rear waist panel 10b. These respective graphics may be interrelated to one another, or they may be unrelated.

With continued reference to FIG. 2, the training pant 10 preferably includes an outermost non-woven layer 22, aesthetically corresponding graphics 21 and 21', elastic side panels 18, a liquid impermeable backsheet layer 17, an absorbent core 16, and a liquid permeable topsheet 14. The absorbent core 16 preferably comprises a mixture of cellulosic fibers, such as comminuted softwood pulp fibers, and distributed particles of a superabsorbent polymer (SAP) although dry fibrous material and absorbent material may be used. The pulp/SAP absorbent core also may be surrounded by a tissue layer over-wrap (not shown) to contain the SAP. However, it should be recognized that any absorbent material known in the art could be used such as those disclosed in U.S. Pat. Nos. 5,281,207, 5,863,288, and 6,068,620 the disclosures of which are incorporated by reference herein in their entirety.

The topsheet 14 preferably is made from any suitable material known in the art, including polymeric fabrics such as polyolefin non-woven fabrics. Common polyolefin non-woven fabrics include polypropylene and polyethylene spunbonded fabrics. Additionally, the topsheet of the present invention can be formed from non-woven bicomponent polymeric fabrics, and it can be treated to impart varying degrees of hydrophilicity to any of a variety of areas thereof.

The training pant can also include a transfer layer 15 preferably disposed between adjacent the absorbent core 16 and top sheet 14, as well as standing leg gathers 13. Non-woven protector strips 12 are positioned at the longitudinal ends of the standing leg gathers 13. The elastic side panels 18 preferably comprise a composite of elastic elements 20 and carrier strips 19. During production, the elastic elements 20 extend entirely across the width of the waist opening. The elastic elements 20 preferably are cut, however, causing them to snap back to the side edges of the article corresponding to the area where the elastics have been adhesively attached to the carrier strips 19. In this manner, the elastic elements 20 are positioned and cut such that they do not overlap the graphics 21, 21'. Further, the training pant 10 may optionally include elastic waist elements 23 and elastic leg elements (not shown) extending along leg openings 24.

Figure 3:
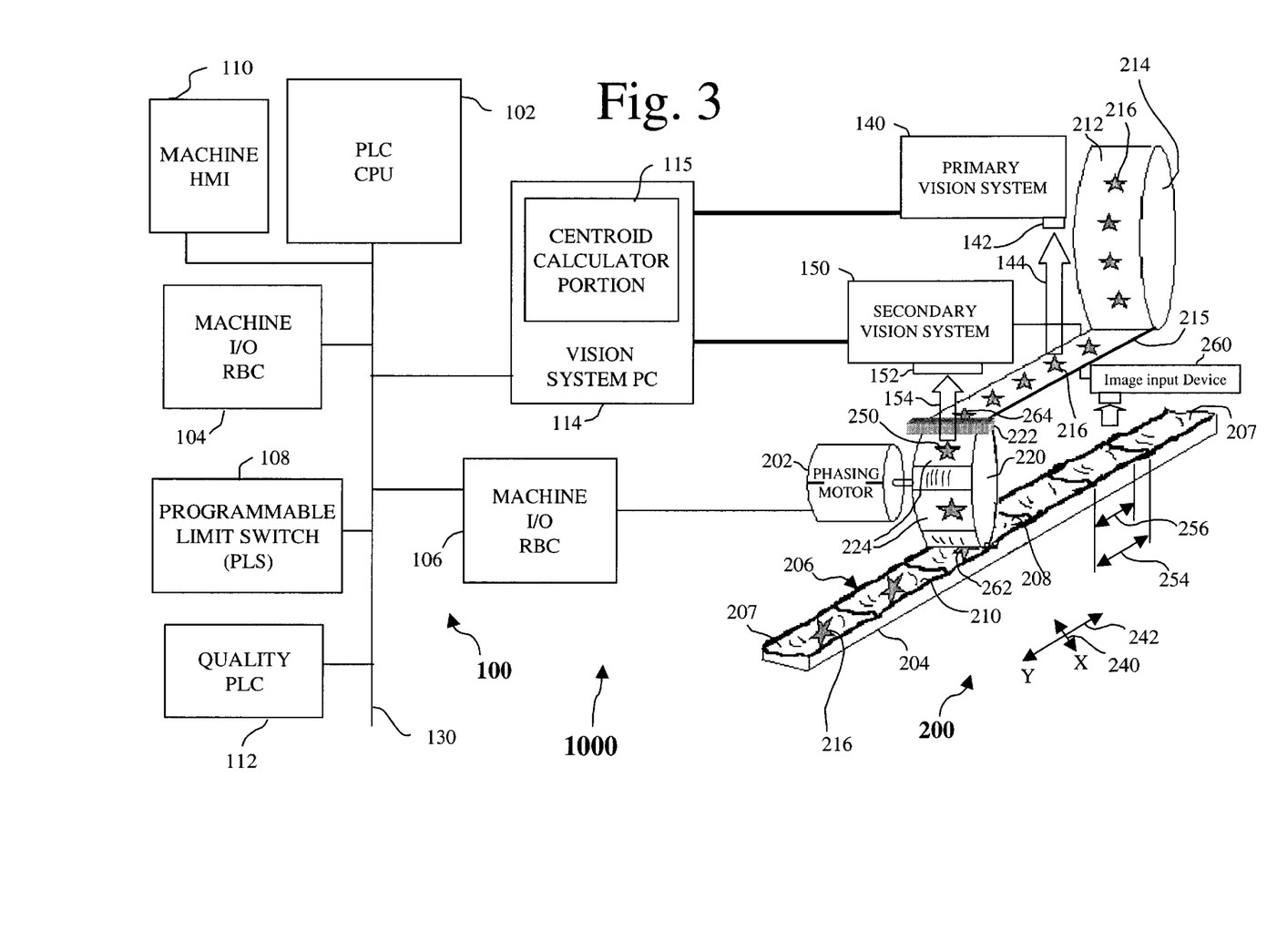
FIG. 3 shows a block diagram of a graphic application system for making an absorbent article having a graphic according to one embodiment of the invention.

Hereinafter, aspects of the methods and systems for disposing a graphic on an absorbent disposable article during production will be described. FIG. 3 is a block diagram showing a graphic application system 1000 in accordance with one embodiment of the invention. The graphic application system 1000 includes a processing portion 100 and a graphic disposing portion 200. Operations in the graphic disposing portion 200 are controlled by the processing portion 100. The graphic disposing portion 200 is a portion of a complete production line (not shown) that produces disposable absorbent articles. Specifically, as described below, the graphic disposing portion 200 operates to dispose graphics on a product.

The processing portion 100 includes a programmable logic controller (PLC) CPU 102 as shown in FIG. 3. The PLC CPU 102 controls operations of the processing portion 100. It should be appreciated that the PLC CPU 102 may be a main processor that controls overall operations in the complete line that serves to produce the disposable absorbent articles. Accordingly, the PLC CPU 102 has numerous other processing requirements in connection with the overall production, which is not shown in FIG. 3. These other operations vary widely based on the other operations of the line.

The PLC CPU 102 is assisted in its processing by numerous machine I/O remote based controllers (RBCs). In the operations illustrated in FIG. 3, two RBCs are utilized to assist the PLC CPU 102. These two RBCs include the machine I/O RBC 104 and the machine I/O RBC 106. As shown in FIG. 3, the various components of the processing portion 100 are connected and in communication with each other utilizing an interface 130. The interface 130 may be any suitable medium of communication including a network or the Internet, for example.

The processing portion 100 also includes a human machine interface (HMI) 110. The machine HMI 110 allows a human user to interface with the PLC CPU 102. Illustratively, a human user might interact with the PLC CPU 102, utilizing the machine HMI 110, to change the operating conditions of the graphic application system 1000.

The processing portion 100 also includes a quality PLC 112 and a programmable limit switch (PLS) 108. The quality PLC 112, working under the PLC CPU 102, controls operations of the graphic disposing portion 200 utilizing a variety of data and input. Further, the PLS 108, also working under the PLC CPU 102, controls operation of a phasing motor 202 in the graphic disposing portion 200. The phasing motor 202 is operationally connected to a graphic applicator 220. Illustratively, the PLS 108 may utilize a resolver to control operations of the phasing motor 202, as is known in the art. Further details of the operations of the quality PLC 112 and the PLS 108, as well as the phasing motor 202 and the graphic applicator 220, are described in further detail below.

The processing portion 100 also includes a vision system PC 114 that controls a primary vision system 140 and a secondary vision system 150, in accordance with one embodiment of the invention. The primary vision system 140 obtains input, such as digital image data 144, from graphics on a graphics transport line 215. Further, the secondary vision system 150 also obtains input, such as digital image data 154, from the graphics on the graphic applicator 220, in accordance with one embodiment of the method and system of the invention. The primary vision system 140 and the secondary vision system 150 outputs this image information to the vision system PC 114, as well as to the PLC CPU 102. The vision system PC 114 performs processing on the information obtained by the primary vision system 140 and the secondary vision system 150. This processing allows the processing portion 100 to control the travel of the graphics as the graphics are transported by the graphics transport line 215 and by the graphic applicator 220.

Specifically, the vision system PC 114 includes a centroid calculator portion 115. As described in further detail below, the centroid calculator portion 115 determines a calculated centroid position of an observed graphic, i.e., based on the digital image of that graphic obtained by the primary vision system 140 or the secondary vision system 150. Further, the centroid calculator portion 115 compares the calculated centroid position with a target centroid position.

Hereinafter, aspects of the graphic disposing portion 200 will be described. As shown in FIG. 3, the graphic disposing portion 200 operates to dispose graphics upon a product layer of disposable absorbent articles. The graphic disposing portion 200 preferably includes a product layer transport portion 204 that serves to transport a product layer 206 from a pre-dispose position 208 to a post-dispose position 210. The product layer 206 includes a layer of absorbent articles as is desired. As shown in FIG. 3, the product layer 206 is composed of a plurality of units 207.

It should be appreciated that various assembly processes are performed prior to the pre-dispose position 208 as shown in FIG. 3. Also, after being processed in the graphic disposing portion 200, the product layer 206 may be passed on to any of a wide variety of further processing steps subsequent to the post-dispose position 210, as is well known in the art.

As shown in FIG. 3, a graphic layer 212 is initially disposed in a wound condition upon a supply roll 214. The graphic layer 212 includes a plurality of graphics 216, as is desired. The graphic layer 212 may be unwound from the supply roll 214 and transported by a graphics transport line 215, in any suitable manner, to the graphic applicator 220 in accordance with one embodiment of the invention. However, it should be appreciated that any suitable arrangement may be utilized to provide the graphics 216 to the graphic applicator 220. Illustratively, a series of stacked graphic layers might be utilized in lieu of the supply roll 214. Further, as should be appreciated, the graphic layer may be transported by the transport line 215 from the supply roll 214 to the graphic applicator 220 using any of a wide variety of devices including pulleys, conveyors, or other processing devices as is desired or necessary.

The graphic disposing portion 200 preferably further includes a cutting device 222. In accordance with one embodiment of the invention, as each graphic 216, which is disposed on the graphic layer 212, is positioned upon the graphic applicator 220, each graphic, or grouped plurality of graphics, for example, is cut from the graphic layer 212. By performing this cutting by the cutting device 222, separated portions of the graphic layer 212 are generated. These separated portions may be characterized as graphic layer portions 224. Each graphic layer portion 224 may be disposed upon and transported by the graphic applicator 220.

Illustratively, the graphic layer portion 224 might be disposed upon the graphic applicator 220 utilizing a vacuum technique, as is known in the art. The graphic applicator 220 transports the graphic layer portion 224 downward, as shown in FIG. 3, so as to be in contact with and mounted or disposed upon the product layer 206 at a disposing location 262. However, it should be appreciated that the method and system of the invention are not limited to utilization of the graphic applicator 220. That is, any suitable device may be utilized to transport the graphic layer portion 224 to the product layer 206. Illustratively, an arrangement of arms may be utilized to transport the graphic layer portion 224 in lieu of the graphic applicator 220.

As described above, the primary vision system 140 obtains input, such as digital image data, from the graphics on the graphics transport line 215. Further, the secondary vision system 150 also obtains input, such as digital image data, from the graphics on the graphic applicator 220, in accordance with one embodiment of the method and system of the invention. Each of the primary vision system 140 and the secondary vision system 150 outputs this information to the vision system PC 114 so to determine the centroid of an observed graphic, and as a result, determine the position of an observed graphic, and in turn control the graphic disposing portion 200 accordingly.

In further explanation of the invention, the secondary vision system 150 will be described in further detail below. However, it should be appreciated that operations of the primary vision system 140 corresponds substantially to the operations of the secondary vision system 150. That is, the primary vision system 140 inputs image information to perform centroid determination, and the secondary vision system 150 also inputs image information to perform centroid determination, so as to allow the processing portion 100 to control the graphics transport line 215 and the graphic applicator 220, respectively.

It should be appreciated that it is not necessary to have each of the primary vision system 140 and the secondary vision system 150. Rather, in accordance with some embodiments of the invention, the graphic disposing portion 200 may only include the primary vision system 140, for example. That is, the primary vision system 140 might alone provide centroid image information by which the processing portion 100 might control the rate of delivery of the graphics to the graphic applicator.

In further explanation of one embodiment of the method and system of the invention, the secondary vision system 150 inputs a digital image 154 of a particular graphic 216 that is currently disposed on the graphic applicator 220, i.e., an observed graphic 250. This observed graphic 250 is disposed upon a graphic layer portion 224, which has been cut. The digital image 154 is taken shortly before the graphic layer portion 224 is disposed upon the product layer 206. The secondary vision system 150 may obtain this digital image in any suitable manner using an input device 152. Illustratively, the input device 152 might be a camera lens arrangement, a photo eye, or some other type of optical sensor. The primary vision system 140 may include an input device 142 in a similar manner.

As shown in FIG. 3, the secondary vision system 150 obtains the digital image 154 subsequent to the graphic layer portion 224 being generated by the cutting device 222 and prior to disposing of the graphic on the product layer 206. As described in further detail below, the digital image 154 of the graphic 216 will be utilized to adjust the final travel, and the ultimate position, of the observed graphic 250 upon the product layer 206. Accordingly, it is desirable to input the digital image 154 at a point in the processing shortly before application of the graphic layer portion 224 upon the product layer 206. That is, it is desired that the conditions of transport of the graphic layer portion 224, from the point at which the digital image 154 is obtained to the point of application of the graphic 216 upon the product layer 206, be determinable. This increases the accuracy of the placement of the graphic upon the product layer 206.

Accordingly, the digital image 154 might be taken prior to the graphic layer 212 being processed by the cutting device 222, so long as the observed graphic 250 is transported to the product layer 206 in a determinable manner. Thus, for example, the secondary vision system 150 might not be utilized, relying instead only on the primary vision system 140.

Figure 4:
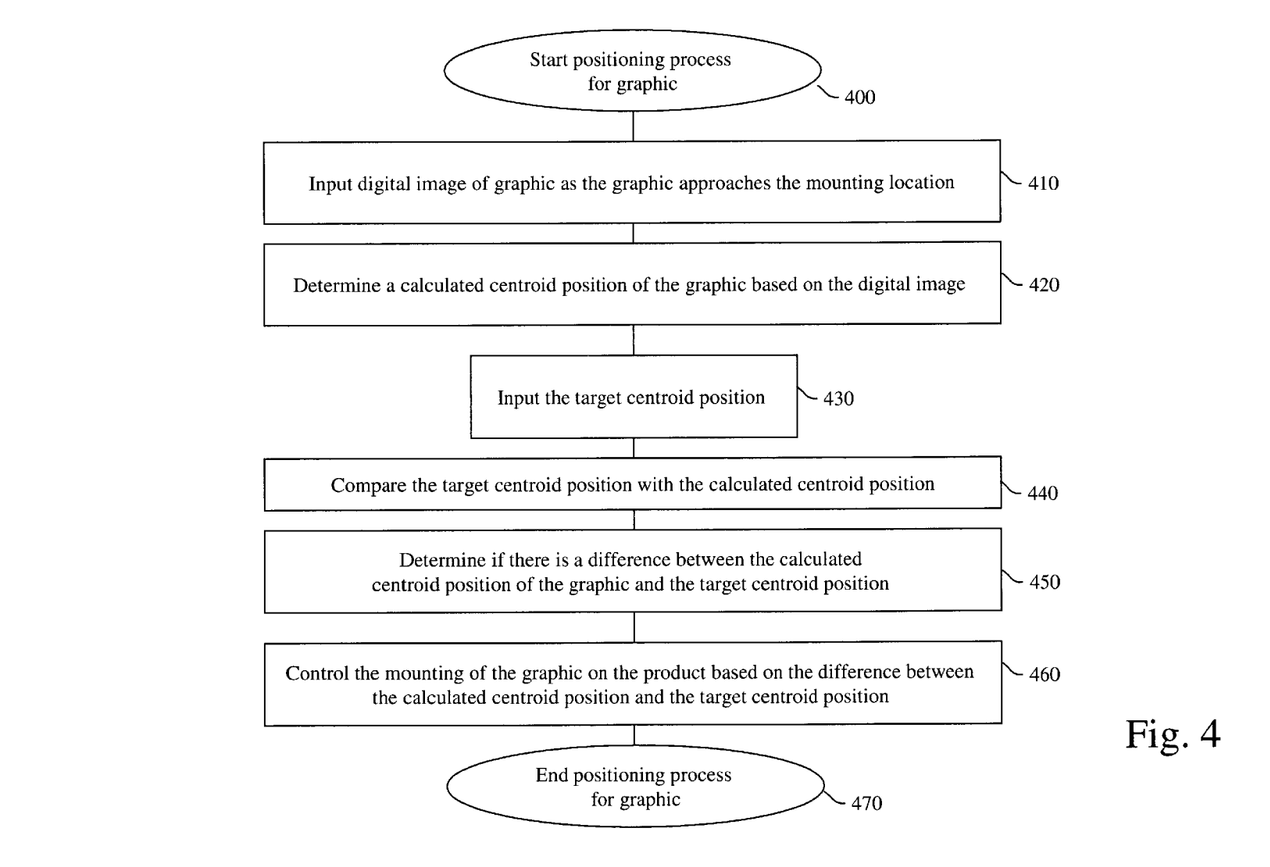
FIG. 4 is a flow chart showing the process for positioning a graphic in accordance with one embodiment of the invention.

In further explanation of the operations of the secondary vision system 150, various processing is performed on the digital image 154 after input by the secondary vision system 150. Hereinafter, aspects of this processing will be described. FIG. 4 is a flow chart showing aspects of the processing performed on the digital image in accordance with one embodiment of the invention.

As shown in FIG. 4, the process starts in step 400 in which the positioning process for the graphic is initiated. Specifically, the PLS 108, in the processing portion 100, triggers the secondary vision system 150 to input a digital image of the graphic 216, i.e., the observed graphic 250, which is presently disposed on the graphic applicator 220. After step 400, in the flow chart shown in FIG. 4, the process passes to step 410. In step 410, the secondary vision system 150 proceeds with input of the digital image 154 of the graphic, i.e., in response to the triggering by the PLS 108. That is, the digital image 154 is taken as the graphic 250 approaches the mounting area, i.e. the disposing area, 262.

This digital image information is output to the vision system PC 114, as well as to the PLC CPU 102. Thereafter, the centroid calculator portion 115 in the vision system PC 114 performs processing on the digital information representing the digital image. Specifically, the centroid calculator portion 115 determines the centroid of the digital image 154. In accordance with one embodiment of the invention, the centroid of the digital image 154 may be obtained by calculating an average position of the pixels that make up the digital image 154. This analysis may be performed along each axis which is of concern, i.e., such as along each of the x-axis 240 and the y-axis 242 (FIG. 3), for example.

As used herein, the term "centroid" means a suitable center point of an observed graphic. Further, a "calculated centroid position" means the position of the centroid of an observed graphic that has been input and calculated. Illustratively, the centroid of an observed graphic may be calculated in the same manner as a center of mass of the observed graphic, i.e., assuming that the graphic is a flat homogenous horizontal plate.

That is, the observed graphic may be characterized as divided into n small elements. For example, these elements might be in the form of pixels. Each element possesses coordinates. A first element may be characterized as possessing the coordinates ($x_1$ and $y_1$). Further, a second element may be characterized as possessing the coordinates ($x_2$ and $y_2$). Additional elements may be characterized as having coordinates in a similar manner.

An equal force, i.e., an "element force", is assumed to be exerted on each of the elements. Further, it is assumed that the force is exerted on each element in the same direction. This results in all the elements of the observed graphic, in theory, exerting a single force, i.e., a "total force", in the same direction. The magnitude of this total force may be obtained by adding each individual element force that is included in the total force:

$$\text{Force\_total} = \text{Element\_force}_1 + \text{Element\_force}_2 + \ldots + \text{Element\_force}_n \qquad \text{Equation 1}$$

In accordance with one embodiment of the invention, the calculated centroid position may be determined by considering the moment of each element. That is, the moment of the observed graphic about the X_centroid of the observed graphic, i.e., the center of mass along the x-dimension, may be utilized in conjunction with considering the moment of each individual element. That is, in processing of the x-dimension:

Force_total·X_centroid=$x_1$·Element_force$_1$+$x_2$·Element_force$_2$+ $X_3$·Element_force$_3$ ... $X_n$·Element_force$_n$     Equation 2

As should be appreciated, mathematical relationships may be utilized to further consider equation 2. That is, we may consider that the size of each element is decreased, while simultaneously increasing the number of elements, for example pixels, which make up the observed graphic. At the limit, this results in the relationships:

Force_total=∫dForce_total;

X_centroid·Force_total=∫$X_n$·dElement_force$_n$; as well as

Y_centroid·Force_total=∫$Y_n$·dElement_force$_n$.     Equations 3 through 5

Accordingly, the above equations and relationships may be utilized by the centroid calculator portion 115 to determine the centroid, i.e., the center of mass, of an observed graphic 250 based on the digital image 154 of such graphic. However, it should be appreciated that the method and system of the invention are not limited to use of equations 1–5, as described above. Rather, other techniques may be used to determine the centroid of an observed graphic. For example, an off-the-shelf software program, which calculates the centroid of an object, may be utilized by the centroid calculator portion, instead of the above equations 1–5. Those skilled in the art are to capable of designing a suitable centroid calculation portion 115 to calculate the centroid of graphic 250, using the guidelines provided herein.

It should be appreciated that only one axis may be of concern in the application of the graphic upon the product layer. Illustratively, as shown in FIG. 3, variation along an x-axis 240 may not be of concern. Accordingly, the centroid position of the digital image 154 may be performed along only the y-axis 242, for example. As shown in FIG. 3, the graphic may be disposed in an x-y plane.

Once the calculated centroid position of the graphic is determined by the centroid calculator portion 115, the process, as shown in FIG. 4, passes to step 430. In step 430, the centroid calculator portion 115 inputs a target centroid position. This target centroid position may be stored in the vision system PC in a suitable memory, or alternatively, may be input from a suitable source, such as the PLC CPU 102. The target centroid position is a predetermined position which the centroid position of the graphic should be. This predetermined position of the target centroid position may be based on any of a wide variety of parameters.

It should be further appreciated that the target centroid position does not need to be a point. Rather, the target centroid position might be an acceptable window, i.e., a range of values along the direction of travel of the graphic layer, for example. Accordingly, if the calculated centroid position is determined to be in the acceptable range of values, for example along the x-axis, then no adjustment in the graphic disposing portion 200 is needed.

After the target centroid position is input in step 430 of FIG. 4, the process passes to step 440. In step 440 the centroid calculator portion 115 of the vision system PC 114 compares the target centroid position with the calculated centroid position.

After step 440, the process passes to step 450 in which a determination is made based on the comparison of step 440. Specifically, the vision system PC 114 determines if there is a difference or deviation between the calculated centroid position of the graphic and the target centroid position. As described in further detail below, if the calculated centroid position deviates from the target centroid position, then the processing portion 100 performs adjustments as is necessary. Illustratively, such adjustments might include adjustment in the speed of the phasing motor 202 as controlled by the PLS 108. That is, after step 450, as shown in FIG. 4, the process passes to step 460. In step 460, the process controls mounting, i.e., disposing, of the graphic on the product based on the difference between the calculated centroid position and the target centroid position.

After step 460, the process passes to step 470. In step 470, the positioning process ends. That is, the processing of the observed graphic 250 will end, and the process will then move to a next graphic 264, as shown in FIG. 3.

Figure 5:
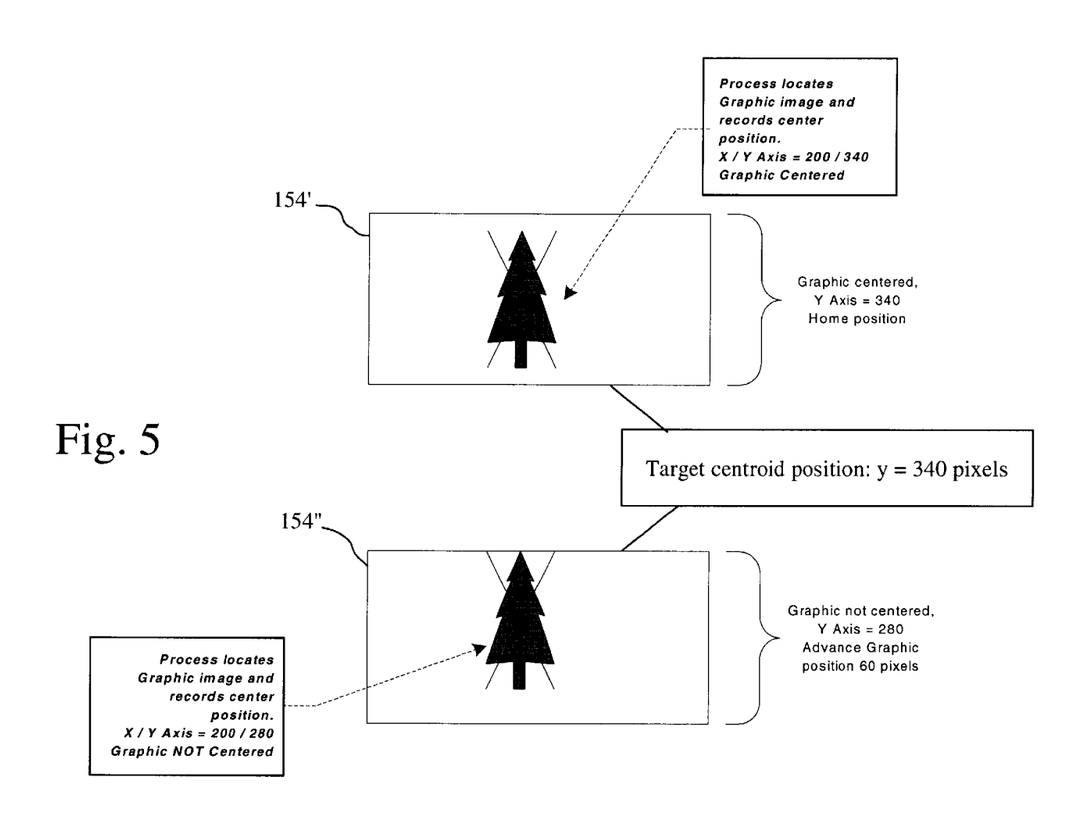
FIG. 5 is a schematic diagram showing aspects of processing the calculated centroid position in accordance with one embodiment of the invention.

FIG. 5 is a diagram that illustrates aspects of the comparison between the target centroid position and the calculated centroid position of an observed graphic 250, as shown in FIG. 3. In accordance with the illustrative example shown in FIG. 5, the position of the graphic is determined along the y-axis. It should be appreciated that any suitable unit of measurement might be utilized in designating the calculated centroid position and the target centroid position. Accordingly, a unit of measurement such as inches or millimeters, or alternatively, a unit of measurement defined by the number of pixels as illustrated in FIG. 5 may be utilized.

As shown in FIG. 5, the target centroid position in the y direction is: y=340 pixels. As shown in FIG. 5, the graphic image 154' of the observed graphic 250 has been input by the secondary vision system 150. In processing of the digital image 154', the centroid calculator portion 115 determines that, in fact, the centroid of the graphic in the y axis is: y=340 pixels. Accordingly, along the y dimension, the calculated centroid position of the image 154' corresponds with the target centroid position. In other words, the input image 154' may be characterized as being at a "home position." Accordingly, in step 450 of FIG. 4, the centroid calculator portion 115 determines that there is not a difference between the target centroid position and the calculated centroid position. Accordingly, no adjustment of the observed graphic 250 in the graphic disposing portion 200 is required. That is, the phasing motor, as controlled by the PLS 108, may be maintained at the same speed, for example.

FIG. 5 also illustrates an additional input image 154". For this example, the target centroid position in the y dimension is again: y=340 pixels. After inputting the input image 154" of an observed graphic 250, the centroid calculator portion 115 calculates the centroid position to have the coordinates:

x=200 pixels; and y=280 pixels.

However, as described above, the target centroid position along the y axis is: y=340 pixels. Accordingly, the input image 154" is not correctly positioned along the y axis. Specifically, the calculated centroid position is offset from the target centroid position by 60 pixels. As a result, adjustment is necessary. Specifically, for example, the graphic position of the observed graphic 250 should be advanced 60 pixels.

To explain further, it should be appreciated that the digital image 154" provides information indicating that the observed graphic 250 is either upline or downline from the target centroid position. That is, with further reference to the input image 154" of FIG. 5, the offset of 60 pixels of the calculated centroid position from the target centroid position indicates that the observed graphic 250 is 60 pixels upline from where the observed graphic 250 should in fact be positioned. As a result, this mis-position will result in adjustments to the graphic disposing portion 200. Specifically, the phasing motor 202 and the graphic applicator 220, as controlled by the PLS 108, may vary the frequency at which each graphic in the graphic layer is delivered for disposing on the product layer, i.e., and in turn vary the frequency at which each graphic in the graphic layer is delivered for disposing on the product layer. Accordingly, if the difference between the calculated centroid position and the target centroid position is such that the calculated centroid position is in an upline position, e.g. 60 pixels, from the target centroid position, then the PLS 108 will increase the speed of the phasing motor 202. As a result, the frequency at which each graphic in the graphic layer is disposed upon the product layer is increased.

It should of course be appreciated that the PLS 108, in accordance with one embodiment of the invention, may also control the speed at which the graphics transport line 215 delivers the graphics 216 to the graphic applicator 220. That is, this control by the PLS 108 is performed based on the primary vision system 140 inputting image information, i.e., digital image data 144, as the graphics are transported on the graphics transport line 215. This image information 144 is then processed to determine the centroid, and thus the position, of each graphic 216, in accordance with embodiments of the invention. The graphics transport line 215 then is adjusted appropriately based on the centroid versus target centroid determination.

Alternatively, the difference between the calculated centroid position and the target centroid position may be such that the calculated centroid position is downline from the target centroid position. As a result, the PLS 108 will control the disposing of the graphic by decreasing the frequency at which each graphic in the graphic layer is disposed upon the product layer.

Figure 6:
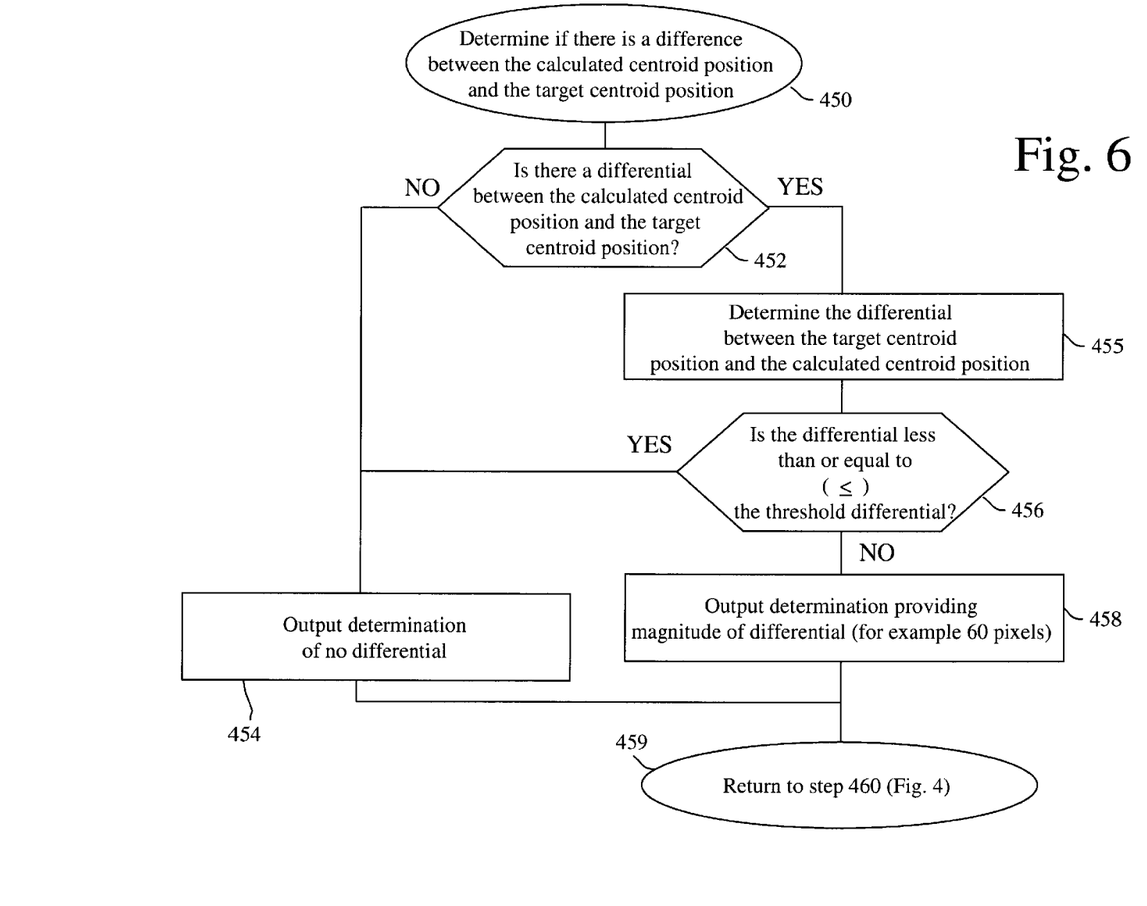
FIG. 6 is a flow chart showing in further detail the "determine if there is a difference between the calculated centroid position and the target centroid position" step of FIG. 4 in accordance with one embodiment of the invention.

In further explanation, FIG. 6 is a flow chart showing in further detail the "determine if there is a difference between the calculated centroid position and the target centroid position" step 450 of FIG. 3, in accordance with one embodiment of the method of the invention. As shown in FIG. 6, the subprocess starts in step 450 and passes to step 452.

In step 452, the centroid calculator portion 115 determines if there is a differential between the calculated centroid position and the target centroid position. As noted above, this calculation of a differential may be performed along a dimension as desired. That is, the differential may be determined along a y-axis, an x-axis, or both, for example. The centroid calculator portion 115 may determine in step 452 that there is not a differential between the calculated centroid position and the target centroid position. As a result, the process passes from step 452 to step 454.

In step 454, the centroid calculator portion outputs a determination that there is no differential. Illustratively, this output may be provided to the quality PLC 112, as well as the PLC CPU 102, which control operations of the graphic disposing portion 200.

Alternatively, the centroid calculator portion 115 may determine in step 452 that there is indeed a differential between the calculated centroid position and the target centroid position. As a result, the process passes from step 452 to step 455. In step 455, the centroid calculator portion 115 determines the magnitude of the differential between the target centroid position and the calculated centroid position. In accordance with the illustrative example above, the magnitude of this differential may be 60 pixels. After step 455, the process passes to step 456.

As illustrated by step 456 of FIG. 6, the process of the invention, in accordance with one embodiment, may utilize a threshold differential. That is, if the differential between the calculated centroid position and a target centroid position is below a predetermined amount, for example 5 pixels, then the process passes from step 456 to step 454. In step 454, the centroid calculator portion 115 outputs a determination of no differential.

Alternatively, the centroid calculator portion 115 may determine that there is a differential between the calculated centroid position and the target centroid position, and further, that the magnitude of that differential exceeds the threshold differential. Accordingly, it should be appreciated that adjustment in the graphic disposing portion 200 is required. As a result, the process passes from step 456 to step 458. In step 458, the centroid calculator portion 115 outputs a determination providing the magnitude of the differential. For example, with reference to the example above, this magnitude may be 60 pixels. After step 458, the process passes to step 459.

As shown in FIG. 6, in step 459, the process returns to step 460 as shown in FIG. 4. In step 460, as described above, the process utilizes the magnitude of the differential, i.e., as determined in step 458, to control the disposing of the graphic 216 on the product layer 206. That is, the process determines the sign (+, −) of the differential and the magnitude of the differential to effect an increase or decrease in the phasing motor 202 or the product line speed, for example.

As described above, the method and system of the invention provide for the accurate determination of the position of a graphic prior to such graphic being disposed upon a product layer 206. It should be appreciated that, to perform the desired mounting, i.e., disposing, of the graphic upon the product layer 206 composed of units 207, the process of the invention monitors the position of the various units 207 along the product layer 206. Illustratively, a suitable product image input device 260, as shown in FIG. 3, might be utilized to monitor the position of units 207, as the units pass by the image input device 260. Further, it should of course be appreciated that the image input device 260 may interface with the other components of the processing portion 100 so as to place the graphic 216 at a particular location on a unit 207. Illustratively, the magnitude of the y-dimension of the unit 207 may be designated as $Y_{Unit}$ 254 as shown in FIG. 3. Further, it may be desired to place the graphic at a particular location within that dimension, i.e., at a position $Y_{Unit\_graphic}$ 256.

As described above, the processing portion 100 includes various components. Further, the various components of the processing portion 100 may communicate and exchange information with each other utilizing the interface 130. However, it should of course be appreciated that various additional components, which are not shown in FIG. 3, may be utilized to effect and assist in communication between the various components.

Further, it should be appreciated that the processing performed by two components, as shown in the illustrative embodiment of FIG. 3, might alternatively be performed by one component. In contrast, it should also be appreciated that the processing performed by one component, as shown in the illustrative embodiment of FIG. 3, might alternatively be performed by two or more components, as may be desired.

The invention has been described in connection with the above exemplary embodiments. These embodiments, however, are merely illustrative and the invention is not restricted thereto. It will be understood by those skilled in the art that other variations and modifications can easily be made within the scope of the invention as defined by the appended claims.

What is claimed is:

1. A method for disposing at least one graphic on an absorbent article product layer comprising:
   providing a continuously moving graphic layer, the graphic layer having at least one graphic printed thereon;
   providing a continuously moving product layer of product;
   inputting an input image of a graphic, which is on the graphic layer, before the graphic is disposed on the product layer;
   determining a calculated centroid position of the graphic based on the input image;
   comparing the calculated centroid position of the graphic with a target centroid position;
   controlling the disposing of the graphic on the product layer based on the comparing; and
   disposing the at least one graphic on the product layer.

2. The method of claim 1, wherein inputting the input image of the graphic is performed using a camera.

3. The method of claim 1, wherein the input image is a digital image.

4. The method of claim 3, wherein determining a calculated centroid position of the graphic based on the input image includes:
   determining the position of substantially all of a plurality of pixels in the graphic; and
   calculating the calculated centroid position by performing an average pixel position based on the position of each pixel in the graphic.

5. The method of claim 4, wherein the calculated centroid position of the graphic is determined for a positional axis, the positional axis extending in the machine direction along a path of travel of the graphic layer.

6. The method of claim 1, wherein comparing the calculated centroid position of the graphic with a target centroid position results in a difference between the centroid position and the target position; and
   controlling the disposing of the graphic on the product layer based on the comparing includes varying the frequency at which each graphic in the graphic layer is disposed on the product layer.

7. The method of claim 6, wherein if the difference between the calculated centroid position and the target centroid position is such that the calculated centroid position is in an upline position from the target centroid position, then controlling the disposing of the graphic layer includes increasing the frequency at which each graphic in the graphic layer is delivered for disposing on the product layer.

8. The method of claim 6, wherein if the difference between the calculated centroid position and the target centroid position is such that the calculated centroid position is in a downline position from the target centroid position, then controlling the disposing of the graphic layer includes decreasing the frequency at which each graphic in the graphic layer is delivered for disposing on the product layer.

9. The method of claim 1, wherein the target centroid position is a window, and comparing the calculated centroid position of the graphic with a target centroid position includes determining if the target centroid is in the window.

10. The method of claim 9, wherein the target centroid position is a window, and the window defines a range of acceptable values for the calculated centroid position.

11. The method of claim 1, wherein the target centroid position is a target point, and comparing the calculated centroid position of the graphic with a target centroid position includes determining the relative position of the calculated centroid position with the target point.

12. The method of claim 1, wherein the following procedures:
   inputting an input image of a graphic before the graphic is disposed on the product layer;
   determining a calculated centroid position of the graphic based on the input image;
   comparing the calculated centroid position of the graphic with a target centroid position; and
   controlling the disposing of the graphic on the product layer based on the comparing, are performed multiple times for a graphic on the graphic layer.

13. The method of claim 1, further including inputting an input image of the product layer, at a point on the product layer, before the graphic is disposed on the product layer.

14. The method of claim 1, wherein the graphic is disposed in an x-y plane, and the calculated centroid position corresponds to the center of mass of the graphic in the x-y plane.

15. A graphic application system for disposing at least one graphic on a product layer of an absorbent article, the graphic application system comprising:
   a graphic disposing portion that inputs a continuously moving graphic layer having at least one graphic disposed thereon and a continuously moving product layer, the graphic disposing portion disposing the at least one graphic on the product layer at a disposing location; and
   a processing portion that controls operations of the graphic disposing portion, the processing portion inputting an image of a graphic as the graphic approaches the disposing location, the processing portion calculating a calculated centroid position of the graphic, and the processing portion comparing the calculated centroid position of the graphic with a target centroid position;
   wherein the processing portion controls the graphic disposing portion to adjust disposing the at least one graphic on the product layer at a disposing location based on the results obtained by comparing the calculated centroid position of the graphic with a target centroid position.

16. The system of claim 15, wherein the processing portion comparing the calculated centroid position of the graphic with a target centroid position results in a difference between the centroid position and the target position; and
   wherein the processing portion controlling the disposing of the at least one graphic on the product layer based on the comparing includes varying the frequency at which each graphic in the graphic layer is disposed on the product layer.

17. The system of claim 15, wherein the target centroid position is a target point, and wherein the processing portion comparing the calculated centroid position of the graphic with a target centroid position includes determining the relative position of the calculated centroid position with the target point.

18. A method for disposing at least one graphic on an absorbent article product layer comprising:
- providing a continuously moving graphic layer, the graphic layer having at least one graphic printed thereon;
- providing a continuously moving product layer of product;
- inputting an input image of a graphic, which is on the graphic layer, before the graphic is disposed on the product layer, the input image being a digital image;
- determining a calculated centroid position of the graphic based on the input image;
- comparing the calculated centroid position of the graphic with a target centroid position;
- controlling the disposing of the graphic on the product layer based on the comparing; inputting an input image of the product layer, at a point on the product layer, before the graphic is disposed on the product layer; and
- disposing the at least one graphic on the product layer;
- wherein comparing the calculated centroid position of the graphic with a target centroid position results in a difference between the centroid position and the target position; and
- controlling the disposing of the graphic on the product layer based on the comparing includes varying the frequency at which each graphic in the graphic layer is disposed on the product layer.

19. The method of claim 18, wherein the target centroid position is a target point, and wherein comparing the calculated centroid position of the graphic with the target centroid position includes determining the relative position of the calculated centroid position with the target point.

20. A system for disposing at least one graphic on an absorbent article product layer comprising:
- means for providing a continuously moving graphic layer, the graphic layer having at least one graphic printed thereon;
- means for providing a continuously moving product layer of product;
- means for inputting an input image of a graphic, which is on the graphic layer, before the graphic is disposed on the product layer;
- means for determining a calculated centroid position of the graphic based on the input image;
- means for comparing the calculated centroid position of the graphic with a target centroid position; and
- means for controlling the disposing of the at least one graphic on the product layer based on the comparing.

* * * * *